United States Patent [19]

Ogawa et al.

[11] Patent Number: 4,883,712
[45] Date of Patent: Nov. 28, 1989

[54] CARBON FIBER CORD FOR RUBBER REINFORCEMENT

[75] Inventors: Hiroyasu Ogawa; Yasuo Kogo, both of Shizuoka; Shuji Takahashi; Yasuo Suzuki, both of Kanagawa, all of Japan

[73] Assignees: Toho Rayon Co., Ltd.; The Yokohama Rubber Co., Ltd., both of Tokyo, Japan

[21] Appl. No.: 945,994

[22] Filed: Dec. 24, 1986

[30] Foreign Application Priority Data

Dec. 24, 1985 [JP] Japan .................... 60-289306
Dec. 24, 1985 [JP] Japan .................... 60-289308

[51] Int. Cl.⁴ .................... B32B 9/00; D02G 3/00
[52] U.S. Cl. .................... 428/367; 57/902; 152/564; 428/375
[58] Field of Search ........... 428/367, 375, 392, 364, 428/408, 368; 57/241, 237, 250, 258, 902; 525/122, 113; 523/428, 434, 438, 468; 152/359

[56] References Cited
U.S. PATENT DOCUMENTS 3,324,198  6/1967  Grüver ...................... 525/122
3,837,904  9/1974  Hill .......................... 428/372
4,044,540  8/1977  Toki et al. .................. 57/903
4,500,660  2/1985  Minamisawa et al. ........ 525/113

Primary Examiner—Lorraine T. Kendell
Attorney, Agent, or Firm—Armstrong, Nikaido, Marmelstein & Kubovcik

[57] ABSTRACT

A carbon fiber cord for rubber reinforcement comprising a carbon fiber bundle having coated thereon from 5 to 50% by weight, based on the total weight of the carbon fiber bundle thus treated, of a resin composition comprising a mixture of 100 parts by weight of a butadiene-acrylonitrile copolymer having a carboxyl group on at least both terminals of the molecule of the copolymer and from 5 to 40 parts by weight of an epoxy resin, or a reaction mixture obtained therefrom, and a curing agent for the epoxy resin, and further coated thereon from 0.5 to 5% by weight, based on the total weight of the carbon fiber bundle and the resin composition coated thereon, of a mixture of a phenolformalin-rubber latex type adhesive for rubber. The carbon fiber cord exhibits excellent adhesion to rubber and fatigue resistance.

13 Claims, 1 Drawing Sheet

CARBON FIBER CORD FOR RUBBER REINFORCEMENT

This invention relates to a carbon fiber cord for reinforcing rubber, which is excellent in adhesion to rubber.

BACKGROUND OF THE INVENTION

Rubber reinforcing cords have been made of organic fibers, such as rayon, polyamide, polyester, and, as the lastest addition, aramide, or inorganic fibers such as glass fiber, steel fiber, etc. For particular use in tires, cords for rubber reinforcement are desirably made of fibrous materials having high strength, high modulus, and lightweight, from the standpoint of controllability and running stability of tires when driving, comfortability to ride on, durability of tires, and fuel cost.

Carbon fibers have a lower density, higher modulus of elasticity, and higher strength as compared with the above-recited glass fiber and steel fiber and are, therefore, highly promising as an excellent reinforcing material for rubber.

However, carbon fibers have a disadvantage of poor adhesion to rubber. In order to overcome this disadvantage, various improved processes for producing reinforcing cords from carbon fibers have hitherto been proposed, such as a process comprising twisting elastomer-impregnated carbon fibers as disclosed in U.S. Pat. No. 3,648,452; a process comprising treating carbon fibers with an epoxy compound and then with an adhesive, such as a mixture of a resorcinol-formaldehyde condensate and a rubber latex (hereinafter referred to as RFL) as disclosed in Japanese Patent Application (OPI) No. 102678/75 (the term "OPI" as used herein means "unexamined published application"); a process comprising treating carbon fibers with a first treating bath containing a polyisocyanate and then with a second treating bath containing RFL as described in Japanese Patent Application (OPI) No. 102679/75; and the like. Nevertheless, none of these attempts have completely succeeded in attaining fully satisfactory adhesion to rubber. In particular, carbon fiber cords are inferior in resistance to repeated fatigue, such as flexural, compression, and the like, due to the high modulus of elasticity of carbon fibers.

According to the inventors' study, it was found that the insufficient performances of the above-described conventional carbon fiber cords arise from insufficient adhesion or bonding between carbon fibers and rubber, the elastomer, or the polyisocyanate. Moreover, although bond of adhesion between epoxy resins and carbon fibers is relatively strong, the epoxy resin-treated carbon fibers do not have softness any more, and, when applied to rubber reinforcement, exhibit rather deteriorated resistance to flexing fatigue.

Since the carbon fibers as treated with the epoxy resin have poor adhesion to rubber, an additional treatment with RFL is required. According to this technique, the uncured epoxy resin is reacted with RFL to increase adhesion strength to rubber, but there is noted a tendency that the resulting cord has reduced softness and reduced fatigue performance.

SUMMARY OF THE INVENTION

One object of this invention is to provide a carbon fiber cord for rubber reinforcement which exhibits excellent adhesion to rubber.

Another object to this invention is to provide a carbon fiber cord for rubber reinforcement which exhibits softness and excellent resistance to flexing fatigue.

It has now been found that the above objects can be accomplished by a carbon fiber cord for rubber reinforcement comprising a carbon fiber bundle having coated thereon from 5 to 50% by weight, based on the total weight of the thus treated carbon fiber bundle, of a resin composition comprising (a) a mixture of 100 parts by weight of a butadiene-acrylonitrile copolymer having a carboxyl group on at least both terminals of the molecule of the copolymer and from 5 to 40 parts by weight of an epoxy resin, or a reaction mixture, obtained therefrom, and (b) a curing agent for the epoxy resin, and further coated thereon from 0.5 to 5% by weight (dry weight), based on the total weight of the carbon fiber bundle and the resin composition coated thereon, of a mixture of a phenolformalin-rubber latex type adhesive for rubber.

BRIEF DESCRIPTION OF THE ACCOMPANYING DRAWING

In FIG. 1, symbols a and b indicate a rubber layer and a cord layer, respectively.

DETAILED DESCRIPTION OF THE INVENTION

Figure 1:
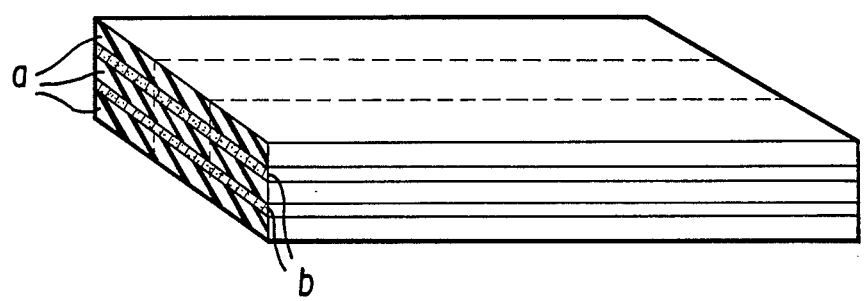
FIG. 1 illustrates a sample to be subjected to two-ply peel test.

The carbon fibers which can be used in the present invention include both carbon fibers having a high carbon content and carbonaceous fibers having a relatively low carbon content. Usually, such carbon fibers have a carbon content of at least 70% by weight.

The carbon fiber bundle which can be used in the present invention can be prepared by known processes, such as the process disclosed in U.S. Pat. No. 4,069,297. For example, the carbon fiber bundle can be prepared by oxidizing known polymer fibers comprising mainly acrylonitrile (acrylic fiber) in an oxidizing atmosphere, e.g., air, at a temperature of from 200° to 300° C. for a period of from 0.1 to 100 minutes, and then carbonizing the oxidized fibers in an inert gas atmosphere, e.g., $N_2$, argon or helium at a temperature of from 600° to 3,000° C.

The carbon fiber bundle may also be prepared by forming fibers from a pitch of petroleum or coal, rendering the fibers infusible, and carbonizing the infusible fibers in an inert gas atmosphere, e.g., nitrogen, argon, helium, etc., at a temperature of from 600° to 3,000° C.

The bundle to be used usually comprises from 100 to 100,000 filaments each having a cross section area of from $2 \times 10^{-4}$ to $5 \times 10^{-6}$ mm$^2$. The carbon fiber bundle preferably has a specific resistivity of from $10^3$ to $10^{-4}$ $\Omega$cm, a tensile strength of not less than 100 kgf/mm$^2$, a modulus of elasticity of not less than $10 \times 10^3$ kgf/mm$^2$, and tensile ductility of at least 1.7.

Examples of the epoxy resin which may be used in the present invention are listed below:

1. Glycidylamine type epoxy resins

Those having an average epoxy equivalent (molecular weight of resin/number of epoxy group in a molecule; hereunder simply referred to as an epoxy equivalent) of 110 to 150, preferably from 120 to 135, are used. Such epoxy resins include, for example, N,N,N',N'-tetraglycidyldiaminodiphenyl-methane (shown by formula (I)), N,N-diglycidylmethaaminophenol glycidyl ether, and a mixture with oligomers (degree of polymerization is 2-4) thereof, which are commercially available under the trade names Araldite MY 720 (manufactured by Ciba-Geigy Corporation) or Epototo YH 434 (Toto Kasei Co.) and YDM 120 (Toto Kasei Co.), respectively. It is preferred to use an epoxy resin mixture containing the oligomers in an amount of 10 to 40 wt % based on the resin.

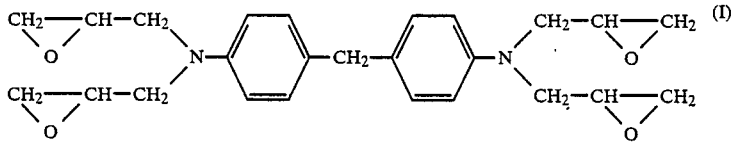

2. Novolak type epoxy resins (1) Phenolic novolak type epoxy resins

Those having an epoxy equivalent preferably of 160 to 200, more preferably from 170 to 190, are used, and they include, for example, Epikote 152 and 154 (Shell Chemicals Corp.), Araldite EPN 1138 and 1139 (Ciba-Geigy Corporation), Dow Epoxy DEN 431, 438, 439 and 485 (Dow Chemical Company), EPPN 201 (Nippon Kayaku Co., Ltd.) and Epicron N 740 (Dainippon Inki Kagaku Kogyo Co.).

(2) Cresol Novolak type epoxy resins

Those having an epoxy equivalent preferably of from 180 to 260, more preferably, from 200 to 250 are used. Examples of such resins include, Ciba-Geigy ECN 1235, ECN 1273, ECN 1280 and ECN 1299 (manufactured by Ciba-Geigy Corporation), EOCN 102, 103 and 104 (manufactured by Nippon Kayaku Co.).

3. Bisphenol A.F and S types epoxy resins

Those having an epoxy equivalent preferably of from 150 to 1,000, more preferably from 300 to 600, are used, and the heat resistance of bisphenol A type epoxy resins having an epoxy equivalent more than about 1,000 is somewhat low. Illustrative bisphenol A type epoxy resins include Epikote 828, 834, 827, 1001, 1002, 1004, 1007 and 1009 (Shell Chemicals Corp.), Araldite CY 205, 230, 232 and 221, GY 257, 252, 255, 250, 260 and 280, Araldite 6071, 7071 and 7072 (Ciba-Geigy Corporation), Dow Epoxy DER 331, 332, 662, 663U and 662U (Dow Chemical Company), Epicron 840, 850, 855, 860, 1050, 3050, 4050 and 7050 (Dainippon Inki Kagaku Kogyo Co.), and Epototo YD115, 115-CA, 117, 121, 127, 128, 128 CA, 128 S, 134, 0012, 011, 012, 014, 014 ES, 017, 019, 020 and 002 (Toto Kasei Co.).

4. Brominated bisphenol A type epoxy resins

Those having an epoxy equivalent preferably of from 200 to 600, more preferably from 220 to 500, are used. Examples of such epoxy resin include Araldite 8011 (Ciba-Geigy Corporation) and Dow Epoxy DER 511 (Dow Chemical Co.).

5. Urethane-modified bisphenol A type epoxy resins

Those having an epoxy equivalent preferably of from 200 to 1,000, more preferably from 250 to 400, are used. Examples include Adeka Resin EPU-6, 10 and 15 (Asahi Denka Co., Ltd.).

6. Alicyclic epoxy resins

Those having an epoxy equivalent preferably of from 110 to 300, more preferably from 130 to 280, are used. Examples are Araldite CY-179, 178, 182 and 183 (Ciba-Geigy Corporation).

In the present invention epoxy resins may be used either alone or in combination. A resin composition containing at least 50 wt %, preferably at least 70 wt %, based on the total epoxy resin, of at least one of N,N,N',N'-tetraglycidyl diaminodiphenylmethane and N,N-diglycidyl meta-aminophenyl glycidyl ether provides particularly high heat resistance. These epoxy resins are preferably combined with a novolak type epoxy resin, bisphenol A type epoxy resin, brominated bisphenol A type epoxy resin or urethane-modified epoxy resin.

Examples of preferable epoxy resin to be used in the present invention includes glycidyl ether or glycidylamine of bisphenol A, bisphenol F, or bisphenol S, etc. Specific examples of preferred epoxy resins are MY720 (produced by Chiba Geigy A.G.) and Epototo YH-434 (produced by Toto Kasei K.K.).

The curing agents for these epoxy resins advantageously include imidazole type and polyamide type curing agents in view of their performance to complete a curing reaction in a short period of time. Specific examples of these curing agents are 2-ethyl-4-methylimidazole as an imidazole type, and Tomide (produced by Fuji Kasei Co., Ltd.) and dicyandiamide as a polyamide type. Of these, 2-ethyl-4-methyl-imidazole is particularly preferred.

The butadiene-acrylonitrile copolymer having carboxyl groups on at least both terminals is preferably liquid to facilitate the reaction with the epoxy resin and to provide a coating of good quality. More specifically, the copolymer preferably has a viscosity of about 500 to 8,000 poise, more preferably from about 1,000 to 7,000 poise, at 27° C. The acrylonitrile monomer content of the copolymer is generally from 10 to 35 wt %, preferably from 15 to 30 wt %. The copolymer may contain up to 3 carboxyl groups including those at the two terminals, and such copolymer can be prepared by using at least one of acrylic and methacrylic acid as a comonomer.

The above-described copolymer can be obtained by radical copolymerization using a catalyst having carboxyl groups. When a compound represented by the following formula (II) is used as a catalyst for the production of a butadiene-acrylonitrile copolymer having terminal moieties including carboxyl groups as shown in the following formula (III) can be obtained.

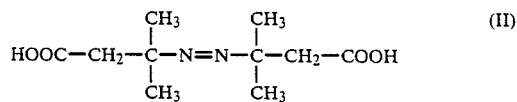

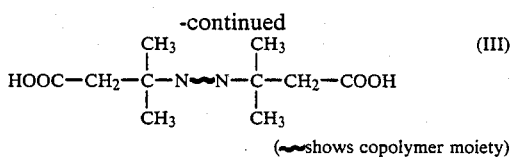

(~~ shows copolymer moiety)

Examples for the above-described copolymerization catalysts include 4,4'-azobis-(4cyanopentanoic acid) and 2,2'-azobis-(4-carboxy-2methylbutyronitrile).

The preparation of the copolymer can also be conducted by using an anion copolymerization catalyst, for example, organic dilithium compound such as dilithium tetraphenylethane, dilithium trans-stilbene, dilithium polyisoprene, 1,4-dilithium butene or 1,5-dilithium pentane. After a butadiene-acrylonitrile copolymer is produced, the copolymer is subjected to a reaction with $CO_2$ gas, and then to a reaction with an acid such as HCl to produce the copolymer having carboxylic acid groups on at least both terminals of the molecular of the copolymer. The reactions proceed as shown below:

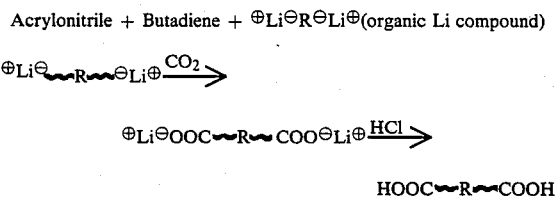

Examples of the copolymer include Hycar CTBN (manufactured of B.F. Goodrich Chemical Co.).

When it is desired to increase the viscosity of the coating compositions in order to improve coating performances, the butadiene-acrylonitrile copolymer is reacted with an epoxy resin so that at least terminal carboxyl groups react with epoxy rings. The reaction is carried out by using a reaction mixture containing at least 1 equivalents of the epoxy group per equivalent of the carboxyl group (i.e., the ratio of the total number of epoxy groups in the epoxy resin to the total number of carboxylic acid groups in the copolymer is at least 1). The conditions for the reaction between the copolymer and epoxy resin vary with the type of the epoxy resin. Usually, the reaction is effected at a temperature between 50 and 170° C. for 1 to 2 hours in the absence or presence of a catalyst such as triphenylphosphine. Curing agents for epoxy resins as recited above may also be added to the reaction system.

The above-described reaction mixture containing the reaction product of the copolymer and the epoxy resin and a mixture of the copolymer and the epoxy resin should comprise from 5 to 40 parts by weight, preferably from 7 to 20 parts by weight of the epoxy resin per 100 parts by weight of the copolymer. If the amount of the epoxy resin is less than 5 parts by weight, adhesion between a carbon fiber bundle and the mixture or reaction mixture is reduced, resulting in inferior flexing fatigue performance for use as rubber reinforcing material.

On the other hand, if it exceeds 40 parts by weight, the resulting carbon fiber cord has reduced softness and deteriorated flexing fatigue performance. Such a carbon fiber cord, when used for rubber reinforcement, is liable to cracking, buckling or breaking.

The epoxy resin curing agent is preferably used in an amount of from 1 to 5% by weight based on the weight of the epoxy resin in the coating composition. When the proportion of the curing agent is less than 1% by weight, the carbon fibers are not sufficiently bundled up so that they are readily unbound and cut during use for rubber reinforcement, thus exhibiting deteriorated flexing fatigue performance. When it exceeds 5% by weight, curing of the copolymer and the epoxy resin tends to excessively proceed to reduce adhesion to adhesive that is coated subsequently, and the resulting carbon fiber cord may have reduced flexing fatigue performance.

The resin composition comprising the reaction mixture or mixture of the copolymer and the epoxy resin and the curing agent for the epoxy resin is coated on a carbon fiber bundle to a coverage of from 5 to 50% by weight, preferably from 10 to 30% by weight based on the thus treated carbon fiber bundle. A coverage of less than 5% by weight results in poor flexing fatigue performance. A coverage exceeding 50% by weight tends to harden the cord, resulting in deterioration of flexing fatigue performance.

Application of the resin composition to the carbon fiber bundle can be carried out by dissolving the above-described components in an appropriate solvent, e.g., acetone, methyl ethyl ketone, methyl cellosolve, etc., either separately or in any combination to prepare a uniform solution, and coating the solution by a known coating technique, such as dip coating, spray coating, and the like. Dip coating is particularly preferred in order to let the coating solution penetrate deep into the inside of the fiber bundle in such a manner that the individual single fibers constituting the bundle may be coated with the solution.

The coating solution usually has a solid content of from about 3 to 70% by weight, though somewhat varying depending on the conditions of dip coating. The temperature of the solution is preferably low from considerations of solution stability and concentration stability, usually ranging from 10° to 30° C. After coating, the carbon fiber bundle is dried to remove the solvent. The drying temperature preferably ranges from 80° to 150° C. It is desirable that drying starts at a lower temperature and the drying temperature is gradually elevated because sudden removal of the solvent at a high temperature is apt to cause formation of voids in the inside of the fiber bundle. After drying, the cord is then subjected to heat treatment usually at a temperature of from 150° to 230° C. for a period of from 1 to 30 minutes. The fiber cord may be heat-treated in either non-contact or contact with a heating means. It should be noted that the resulting cord has a round form in the former case or a rather flat form in the latter case. Accordingly, conditions of heat treatment should be selected taking this fact into consideration and depending on the final intended use of the product. It is preferable to conduct the heat treatment after complete removal of the solvent in order to prevent void formation inside of the cord or blister formation on the surface of the cord. By virtue of this heat treatment, the epoxy resin is cured and, at the same time, the copolymer and the epoxy resin are completely reacted so that the coating becomes insoluble in the solvent remaining in the cord, e.g., methyl ethyl ketone.

The carbon fiber cord having coated thereon a resin composition of the copolymer, the epoxy resin, and the curing agent is then coated with a phenol-formalin-rubber latex type adhesive for rubber.

The phenol-formalin-rubber latex type adhesive used in the present invention is a conventionally used adhesive for adhering fibers with a rubber.

The phenol compound which is preferably used in the adhesive is a compound represented by the following formula (IV)

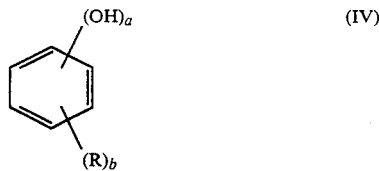

wherein a represents 1 or 2, R represents H or an alkyl group preferably having from 1 to 4 carbon atoms, and b represents 1 or 2.

Examples for the phenol include phenol, o-cresol, m-cresol, p-cresol, 3,5-xylenol, isothimol, thimol, catechol, and resorcinol.

The adhesive is prepared by mixing a phenol compound with formalin and allowing the mixture to react at room temperature (from about 20° to 30° C.) for from about 6 to 30 hours in the presence of a catalyst for a condensation reaction, such as alkaline catalyst or an acid catalyst to form a so-called primary condensation product which can be shown by formula (V)

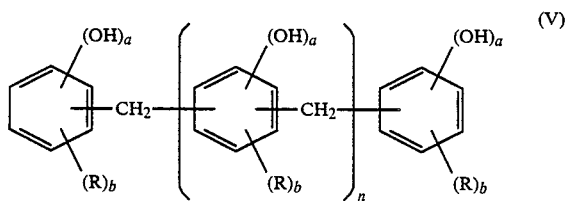

wherein a, b, and R each represents as defined above and n represents 0 or an integer of from 1 to 3, and then a rubber latex is added to the reaction mixture.

The molar ratio of the phenol compound and the formaldehyde is preferably from 1/0.1 to 1/8, and more preferably from 1/0.5 to 1/5. As the catalyst it is preferable to use an alkali such as sodium hydroxide or potassium hydroxide.

In the adhesive, a condensate represented by formula (VI) shown below may be used in place of a part of the amount of a phenol in order to improve adhesion to the rubber

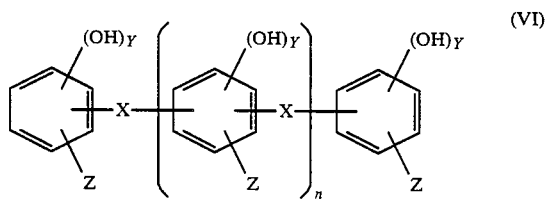

wherein X represents a methylene group, $-S_m-$ (wherein m is an integer of from 1 to 8), or an oxygen atom; Y represents 1 or 2; Z represents a hydrogen atom, a halogen atom, an alkyl group preferably having from 1 to 4 carbon atoms, an allyl group, an allyloxy group, or an alkoxy group preferably having from 1 to 4 carbon atoms; and n represents 0 or an integer of from 1 to 15.

The preferable amount of the condensate represented by formula (VI) is up to 70 weight% based on the total weight of the condensate and a phenol. In order to obtain the effect of improvement of adhesion, it is preferable that the amount is not less than 30 weight %.

A method for producing such a condensate is disclosed in Japanese Patent Application (OPI) No. 109684/83.

The rubber latex to be used in the adhesive includes a natural rubber latex, a styrene-butadiene copolymer latex, a vinylpyridine-styrene-butadiene terpolymer latex, a nitrile rubber latex, a chloroprene rubber latex etc., and a mixtures thereof. Of these, a vinylpyridine-styrene-butadiene ter-polymer latex (preferable molar ratio: 10-15/15-20/60-70) is particularly preferred.

In the preparation of the adhesive, the reaction mixture and the rubber latex are mixed at a weight ratio of from 1/1 to 1/15, and preferably from 1/3 to 1/12, on a solid basis, and the resulting mixture is dispersed in water so as to have solids content of from 10 to 35% by weight.

The thus prepared adhesive is preferably used within 100 hours, preferably 48 hours after mixing a phenol and formalin because the condensation reaction proceeds also after mixing the latex with the reaction mixture, and thereby the viscosity of the adhesive is gradually increased to make processability worse.

In carrying out the impregnation of the adhesive to the carbon fiber bundle having coated thereon the epoxy resin composition, the aqueous dispersion of the adhesive having the above-recited solid content, is applied thereto by, for example, dipping at room temperature (usually from 10 to 25° C.). If necessary, the amount to be applied can be adjusted by means of squeeze rollers.

If the adhesive coverage is less than 0.5% by weight based on the total weight of the carbon fiber bundle and the resin composition coated thereon the resulting cord shows poor adhesion to rubber and reduced flexing fatigue performance. In cases where the adhesive coverage exceeds 5% by weight, the reaction of the adhesive with epoxy groups is accelerated, resulting in excessive hardness, which leads to deterioration of flexing fatigue performance.

If desired, the resin composition comprising a mixture of the copolymer and an epoxy resin or a reaction mixture thereof containing a reaction product and a curing agent for the epoxy resin may further contain various additives, such as viscosity modifiers, conductivity modifier, colorants, and the like, preferably in an amount of from 10 to 30 % by weight based on the weight of the composition.

Examples of such additives include a polyethylene glycol, polypropylene glycol and a diglycidyl ether of an ethylene-propylene block copolymer.

As described above, the carbon fiber cords in accordance with the present invention are composed of firmly bound fibers so that cracking hardly occurs. Further, they are excellent in adhesion to rubber and especially in resistance to repeated fatigue. Therefore, the carbon fiber cords of the present invention are useful as reinforcement for rubber while taking advantage of high strength and high modulus of elasticity possessed by carbon fibers. In particular, they are capable of greatly improving running stability and fuel efficiency of automobiles when used for tires.

The carbon fiber cord according to the present invention is useful as a reinforcing material for commonly employed rubbers, such as natural rubber and synthetic rubbers, e.g., styrene-butadiene rubber, isoprene rubber, isobutylene isoprene rubber, nitrile-butadiene rubber, etc.

The rubber latex to be used in the adhesive is appropriately selected according to the kind of rubber to which the cord is applied. For example, a nitrile-butadiene rubber latex is used for nitrile-butadiene rubber; and for other rubbers a natural rubber latex, a styrene-butadiene rubber latex, a vinylpyridine-styrene-butadiene rubber latex, etc., can be used suitably.

The above-described rubber to which the cord is applied may contain various additives, such as carbon black, sulfur, a vulcanization accelerator, an antioxidant, zinc oxide, stearic acid, a process oil, and the like.

The cord according to the present invention can be used for reinforcement of rubber in a conventional manner. For example, the cord or the cord in the form of a woven fabric may be sandwiched between two sheets composed of a rubber composition containing the above enumerated additives, followed by heating under pressure to effect vulcanization simultaneously with molding.

Use of the cord according to the present invention makes it possible to produce rubber products having high durability because of the excellent adhesion of the cord to rubber.

This invention is now illustrated in greater detail with reference to the following examples, but it should be understood that these examples are not intended to limit the present invention.

In these examples, all the percents and parts are given by weight unless otherwise indicated. In the following examples, the adhesive strength between carbon fiber cords and rubber was evaluated by a drawing test and a two-ply peel test according to the following method. Further, carbon fiber cords were evaluated for flexing fatigue performance according to the following test method.

Drawing Test

A carbon fiber cord was embedded in a length of 8 mm in an unvulcanized rubber compound having the following composition, and the rubber was vulcanized at 150° C. under a pressure of 30 kg/cm2 for 30 minutes. The force required for drawing the cord from the vulcanized rubber was measured.

| Rubber Compounding: | |
|---|---|
| Natural rubber RSS #3 | 100 parts |
| Zinc oxide | 5 parts |
| Stearic acid | 2 parts |
| Carbon black (GPF) | 50 parts |
| Antioxidant (Santoflex 13 produced by Mitsubishi Monsanto Chemical Co., Ltd.; N—(1,3-dimethylbutyl)-N'—phenyl-paraphenylenediamine) | 1 part |
| Aromatic oil | |
| Sulfur | 2.25 parts |
| Vulcanization accelerator DM (dibenzothiazolyl disulfide) | 1 part |

Two-Ply Peel Test

Twenty cords were placed on an unvulcanized rubber sheet having the same composition as used above (width: 25 mm; length: 200 mm; thickness: 1.0 mm) in parallel to the lengthwise direction of the sheet. Another unvulcanized rubber sheet of the same composition was piled thereon, and 20 cords were aligned on this sheet in the same manner as above. Finally, a rubber sheet of the same composition was placed thereon to build up a so-called two-ply structure of rubber/cord/rubber/cord/rubber. After the structure was heated at 150° C. under a pressure of 30 kg/cm2 for 30 minutes to effect vulcanization, two cord layers were peeled apart in the lengthwise direction to evaluate adhesion of the cord to rubber. FIG. 1 illustrates the two-ply structure used in this test. In FIG. 1, symbols a and b indicate a rubber layer and a cord layer, respectively.

Flexing Fatigue Test

Figure 2:
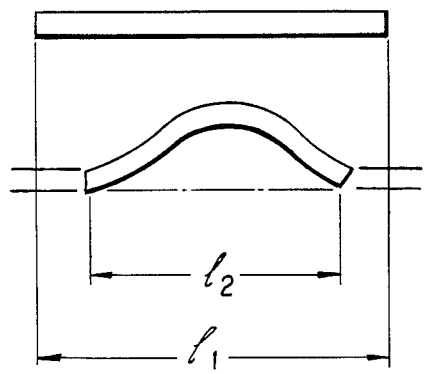
FIG. 2 is a schematic view to show the length of a rubber block before flexing ($l_1$) in a flexing fatigue test and the distance of ends of the block upon flexing ($l_2$).

Three cords were inserted between two unvulcanized rubber sheet (width: 25.4 mm; length: 76.2 mm; thickness: 3.2 mm) having the same composition as described above in the lengthwise direction f the sheet at 6.35 mm intervals. The rubber sheets having the cords embedded therein were vulcanized at a temperature of 150° C. under a pressure of 30 kg/cm2 for 30 minutes to prepare a rubber block. The rubber block was fitted to a de Mattia type flex fatigue test machine, and the rubber block was subjected to 100,000 flexes with a stroke of 30 mm (30 mm=$l_1-l_2$ in FIG. 2). The rubber block was cut into three equal parts, in the direction parallel to the cords as shown by doted lines in FIG. 1 and the rubber block having the cord was pulled at a rate of pulling of 300 mm/min at a distance of 30 mm between chucks to measure the tensile strength after the flexing fatigue. A percentage of the tensile strength after the flexing fatigue to that before the test was obtained to evaluate flexing resistance of the cord (distance between chucks: gauge length).

EXAMPLE 1

A hundred parts of a carboxyl-terminated butadiene-acrylonitrile copolymer (Hycar CTBN 1300×13, produced by Goodrich Co.) and 18 parts of a glycidylamine type epoxy resin (MY720, Ciba Geigy A.G.) were mixed and allowed to pre-react at 110° C. for 2 hours. Subsequently, the resulting reaction mixture was dissolved in methyl ethyl ketone so as to result in a solid content of 20%. To the resin solution was added 2-ethyl-4-methylimidazole as a curing agent in an amount of 2.5% based on the weight of the resin, followed by stirring.

The resulting resin solution was continuously impregnated into a carbon fiber bundle composed of 3,000 filaments each having a diameter of 7 μm (tensile strength: 410 kgf/mm$^2$; tensile modulus of elasticity: 24 x 10$^3$ kgf/mm$^2$), followed by drying at 120° C. for 3 minutes. The dried fiber bundle was then subjected to curing at 200° C. for 2 minutes. The resulting carbon fiber bundle was found to have a resin composition coverage of 19.5%.

The carbon fiber bundle was then continuously dipped in a 25% (content of materials in water) RFL bath having the following formulation at 25° C.

| RFL Bath Formulation: | | |
|---|---|---|
| i | Soft water | 387.6 parts |
| ii | Sodium hydroxide (10% aqueous solution) | 6.3 parts |
| iii | Resorcinol | 23.1 parts |
| iv | Formalin (37% formaldehyde aqueous solution) | 25.6 parts |
| | Nipol 2518FS (solids content: 40%) (vinylpyridine-styrene-butadiene copolymer rubber latex produced by | 543.5 parts |

-continued

| | RFL Bath Formulation: | |
|---|---|---|
| v | Nippon Geon Co., Ltd.) Aqueous ammonia (28%) | 13.9 parts |
| | Total: | 1000.0 parts |

The reaction product was obtained by mixing components (i), (ii), (iii), and (iv) and the mixture was stirred at 25° C. for 6 hours. Components (v) and (vi) were added to the reaction mixture, and the thus obtained mixture was allowed to stand at the room temperature for 20 hours.

After drying at 85° C. for 2 minutes, the carbon fiber bundle was subjected to heat treatment at 210° C. for 2 minutes. The resulting fiber cord was found to have an RFL coverage of 3% based on the weight of the carbon fiber bundle having coated with the resin composition thereon.

As a result of evaluation of performances, the carbon fiber cord had a drawing strength of 19.5 kg/8 mm, a two-ply peel strength of 25.9 kg/25 mm, and a flexing fatigue strength retention of 85%.

EXAMPLE 2 and COMPARATIVE EXAMPLES 1 to 6

Carbon fiber cords were obtained in the same manner as described in Example 1 except that the amounts of MY-720 and 2-ethyl-4-methylimidazole and the coverage of the resin composition were varied as indicated in Table 1.

Each of the resulting cords was evaluated for performance properties, and the results obtained are shown in Table 1. It can be seen from Table 1 that the cords according to the present invention are excellent in adhesion to rubber and fatigue resistance.

TABLE 1

| Example No. | Amount of MY720 (part) | Amount of 2-Ethyl-4-Methylimidazole (%) | Coverage of Resin Composition (%) | Drawing Strength (kg/8 mm) | Two-Ply Peel Strength (kg/25 mm) | Flexing Fatigue Strength Retention (%) |
|---|---|---|---|---|---|---|
| Comparative Example 1 | 2* | 25 | 19.5 | 17.0 | 23.3 | 65 |
| Comparative Example 2 | 20 | 25 | 3.2* | 8.3 | 10.5 | 42 |
| Example 2 | 20 | 25 | 19.3 | 19.2 | 26.1 | 84 |
| Comparative Example 3 | 20 | 25 | 63.1* | 19.0 | 25.8 | 49 |
| Comparative Example 4 | 20 | 0.25* | 19.1 | 19.1 | 25.6 | 72 |
| Comparative Example 5 | 20 | 17.5* | 19.3 | 19.3 | 25.8 | 68 |
| Comparative Example 6 | 43* | 1.2 | 19.4 | 19.0 | 26.1 | 41 |

Numbers with an asterisk (*) in Table 1 and hereafter indicates that the number is outside of the scope of the present invention.

EXAMPLE 3 and COMPARATIVE EXAMPLES 7 and 8

Carbon fiber cords were obtained in the same manner as in Example 1 except for varying the RFL coverage as indicated in Table 2.

Each of the resulting cords was evaluated for performance properties, and the results obtained are also shown in Table 2. As can be seen from Table 2, the carbon fiber cord according to the present invention exhibits excellent adhesion to rubber and fatigue resistance.

TABLE 2

| Example No. | RFL Coverage | Drawing Strength (kg/8 mm) | Two-Ply Peel Strength (kg/25 mm) | Flexing Fatigue Strength Retention |
|---|---|---|---|---|
| Comparative Example 7 | 0.1* | 13.0 | 13.5 | 48 |
| Example 3 | 3.3 | 19.5 | 26.8 | 88 |
| Comparative Example 8 | 7.5* | 19.5 | 26.5 | 49 |

EXAMPLE 4

A carbon fiber cord was obtained in the same manner as in Example 1, except that the mixture of the copolymer and the epoxy resin was not pre-reacted.

As a result of evaluation of performance properties, the resulting cord had a drawing strength of 19.4 kg/8 mm, a two-ply peel strength of 25.9 kg/25 mm, and a flexing fatigue strength retention of 85%. These results are substantially equal to those obtained in Example 1, indicating that the resulting cord is also excellent in adhesion to rubber and fatigue resistance.

EXAMPLE 5

Acrylic fibers comprising 98% acrylonitrile, 1% methyl acrylate, and 1% itaconic acid (3,000 filaments each having a diameter of 10 μm; tensile strength: 6.5 g/d; elongation: 15%) were air-oxidized at 250° C. for 25 minutes under a load of 180 mg/d, followed by carbonizing in a nitrogen atmosphere at 850° C. for 3 minutes under a load of 200 mg/d to obtain a carbonaceous fiber bundle. The resulting carbonaceous fiber bundle was designated as Bundle (A).

Bundle (B) was prepared in the same manner as for Bundle (A), except that the load in the air-oxidation was changed to 100 mg/d. Properties of the carbonaceous fibers of Bundles (A) and (B) are shown in Table 5.

TABLE 5

| Bundle | Bonded Oxygen Content (%) | Tensile Modulus of Elasticity (kgf/mm²) | Tensile Elongation (%) | Carbon Content (%) |
|---|---|---|---|---|
| (A) | 6.3 | 16,000 | 1.9 | 78 |
| (B) | 6.4 | 14,000 | 1.7 | 79 |

The thus obtained carbonaceous fiber bundles were treated with a resin solution, dried, and cured in the same manner as Example 1 to obtain carbonaceous fiber bundles having a resin composition coverage of 19.5%.

The thus obtained carbonaceous fiber bundles were treated with RFL, dried and heat treated in the same manner as in Example 1 to obtain bundles having RFL coverages as shown in Table 6.

TABLE 6

|  | Bundle (A) | Bundle (B) |
|---|---|---|
| RFL Coverage (%) | 20.3 | 19.8 |
| Two-Ply Peel Strength (kg/25 mm) | 26.3 | 26.4 |
| Drawing Strength (kg/8 mm) | 18.3 | 16.5 |
| Flexing Fatigue Strength Retention (%) | 88 | 86 |

While the invention has been described in detail and with reference to specific embodiments thereof, it will be apparent to one skilled in the art that various changes and modifications can be made therein without departing from the spirit and scope thereof.

What is claimed is:

1. A carbon fiber cord for rubber reinforcement comprising a carbon fiber bundle having a cured coating thereon provided by coating and curing a resin composition comprising a mixture of 100 parts by weight of a butadiene-acrylonitrile copolymer having a carboxyl group on at least both terminals of the molecule of the copolymer and from 5 to 40 parts by weight of an epoxy resin, or a reaction mixture obtained therefrom, and a curing agent for the epoxy resin in an amount of from 5 to 50% by weight, based on the total weight of the carbon fiber bundle and the coating, and further having a coating thereon of a mixture or a phenol-formalin-rubber latex type adhesive for rubber in an amount of from 0.5 to 5% by weight, based on the total weight of the carbon fiber bundle and the resin composition coated thereon.

2. A carbon fiber cord for rubber reinforcement as in claim 1, wherein said epoxy resin is selected from the group consisting of glycidylamine epoxy resins, novolak epoxy resins, epoxy resins, bisphenol A, F and S epoxy resins, brominated bisphenol A epoxy resins, urethane-modified bisphenol A epoxy resins, and alicyclic epoxy resins.

3. A carbon fiber cord for rubber reinforcement as in claim 1, wherein said curing agent for the epoxy resin is selected from the group consisting of an imidazole type catalyst and a polyamide type catalyst.

4. A carbon fiber cord for rubber reinforcement as in claim 1, wherein said curing agent for the epoxy resin is selected from the group consisting of dicyandiamide and 2-ethyl-4-methyl-imidazole.

5. A carbon fiber cord for rubber reinforcement as in claim 1, wherein said copolymer has a viscosity of from 500 to 8,000 poise at 27° C.

6. A carbon fiber cord for rubber reinforcement as in claim 1, wherein said curing agent is present in an amount of from 1 to 5% by weight based on the weight of the epoxy resin.

7. A carbon fiber cord for rubber reinforcement as in claim 1, wherein the portion of said copolymer derived from acrylonitrile monomer is from 10 to 35% by weight.

8. A carbon fiber cord as in claim 1, wherein said adhesive is prepared by first mixing a phenol compound with a formaldehyde to form a condensate thereof in the reaction mixture thus obtained and further mixing a rubber latex therewith.

9. A carbon fiber cord as in claim 1, wherein said phenol is a compound represented by formula (IV)

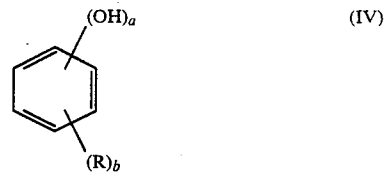

wherein a represents 1 or 2, R represents H or an alkyl group, and b represents 1 or 2.

10. A carbon fiber cord as in claim 1, wherein said phenol component used in said adhesive consists of compound represented by formula (IV):

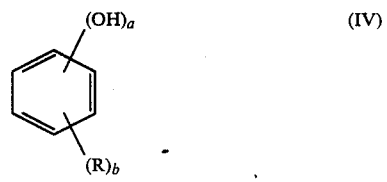

wherein a represents 1 or 2, R represents a member selected from the group consisting of H and alkyl, and b represents 1 or 2; and a condensate represented by formula (VI):

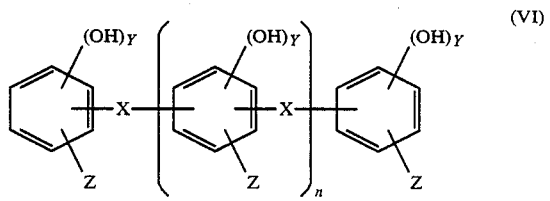

wherein X represents a member selected from the group consisting of methylene, —Sm— wherein m is an integer from 1 to 8, and oxygen, Y represents 1 or 2, Z represents a member selected from the group consisting of hydrogen, halogen, allyl, alkyl, allyloxy and alkoxy, and n represents zero or an integer of from 1 to 15.

11. A carbon fiber cord as in claim 10, wherein the condensate is used in an amount of up to 70% by weight based on the total weight of the compound represented by formula (IV) and the condensate represented by formula (VI).

12. A carbon fiber cord as in claim 1, wherein said latex is selected from the group consisting of a natural rubber latex a styrene-butadiene rubber latex, a vinyl-pyridine-styrene-butadiene rubber latex, a nitrile rubber latex, and a chloroprene rubber latex.

13. A carbon fiber cord as in claim 1, wherein said phenol used in said adhesive is a compound selected from the group consisting of phenol, o-cresol, m-cresol, p-cresol, 3,5-xylenol, thimol, isothimol, catechol and resorcinol.

* * * * *